United States Patent
Thayer et al.

(10) Patent No.: US 11,931,966 B2
(45) Date of Patent: Mar. 19, 2024

(54) SYSTEMS AND METHODS FOR OPTICAL ASSESSMENTS OF BIOINK PRINTABILITY

(71) Applicant: Cellink Bioprinting AB, Gothenburg (SE)

(72) Inventors: Patrick Thayer, Blacksburg, VA (US); Hany Abushall, Blacksburg, VA (US); Hector Martinez, Gothenburg (SE); Erik Gatenholm, Gothenburg (SE)

(73) Assignee: CELLINK BIOPRINTING AB, Gothenburg (SE)

( * ) Notice: Subject to any disclaimer, the term of this patent is extended or adjusted under 35 U.S.C. 154(b) by 222 days.

(21) Appl. No.: 16/964,899

(22) PCT Filed: Jan. 25, 2019

(86) PCT No.: PCT/IB2019/000215
§ 371 (c)(1),
(2) Date: Jul. 24, 2020

(87) PCT Pub. No.: WO2019/145795
PCT Pub. Date: Aug. 1, 2019

(65) Prior Publication Data
US 2021/0031456 A1    Feb. 4, 2021

Related U.S. Application Data

(60) Provisional application No. 62/622,650, filed on Jan. 26, 2018.

(51) Int. Cl.
*B29C 67/00*    (2017.01)
*B29C 64/209*   (2017.01)
(Continued)

(52) U.S. Cl.
CPC .......... *B29C 64/393* (2017.08); *B29C 64/209* (2017.08); *B33Y 10/00* (2014.12);
(Continued)

(58) Field of Classification Search
CPC ..... B29C 64/209; B29C 64/393; B33Y 10/00; B33Y 30/00; B33Y 50/00; B33Y 50/02; B33Y 70/00; G06N 3/08
See application file for complete search history.

(56) References Cited

U.S. PATENT DOCUMENTS

| 5,236,416 A | 8/1993 | McDaniel et al. |
| 6,103,790 A | 8/2000 | Cavaille et al. |

(Continued)

FOREIGN PATENT DOCUMENTS

| CN | 103893825 B | 6/2015 |
| CN | 108248020 A | 7/2018 |

(Continued)

OTHER PUBLICATIONS

Co-pending European Patent Application No. 15871191.1, Supplemental Search and Opinion, dated Sep. 18, 2018, 8 pages.

(Continued)

*Primary Examiner* — Ryan M Ochylski
(74) *Attorney, Agent, or Firm* — New River Valley IP Law, P.C.; Michele L. Mayberry; Ashley M. Gates (57) ABSTRACT

Systems and methods for optical assessments of bioink printability are described. The systems and methods include the use of hardware, software and optical targets to aid in the evaluation of bioink printability. The optical targets are developed and fabricated from 3D printable materials determined to be "nozzle fidelic" and/or materials that possess well characterized thermosensitivity. The optical targets make it possible to rapidly compare and evaluate bioink printability and can be easily customized and tailored for specific applications.

22 Claims, 7 Drawing Sheets

(51) Int. Cl.

| | | |
|---|---|---|
| *B29C 64/393* | (2017.01) | |
| *B33Y 10/00* | (2015.01) | |
| *B33Y 30/00* | (2015.01) | |
| *B33Y 50/02* | (2015.01) | |
| *B33Y 70/00* | (2020.01) | |
| *B33Y 70/10* | (2020.01) | |
| *G06N 3/08* | (2023.01) | |
| *G06N 5/01* | (2023.01) | |

(52) U.S. Cl.
CPC ............... *B33Y 30/00* (2014.12); *B33Y 50/02* (2014.12); *B33Y 70/00* (2014.12); *B33Y 70/10* (2020.01); *G06N 3/08* (2013.01); *G06N 5/01* (2023.01)

(56) References Cited

U.S. PATENT DOCUMENTS

| | | |
|---|---|---|
| 6,509,733 B2 | 1/2003 | Blubaugh et al. |
| 6,942,830 B2 | 9/2005 | Mülhaupt et al. |
| 7,052,263 B2 | 5/2006 | John |
| 7,105,357 B1 | 9/2006 | Kalkum et al. |
| 7,122,712 B2 | 10/2006 | Lutri et al. |
| 7,195,472 B2 | 3/2007 | John |
| 7,636,610 B2 | 12/2009 | Schillen et al. |
| 7,783,371 B2 | 8/2010 | John et al. |
| 7,892,474 B2 | 2/2011 | Shkolnik et al. |
| 7,894,921 B2 | 2/2011 | John et al. |
| RE43,955 E | 2/2013 | Shkolnik et al. |
| 8,394,313 B2 | 3/2013 | El-Siblani et al. |
| 8,691,974 B2 | 4/2014 | Gatenholm et al. |
| 8,931,880 B2 | 1/2015 | Murphy et al. |
| 9,073,261 B2 | 7/2015 | El-Siblani et al. |
| 9,315,043 B2 | 4/2016 | Murphy et al. |
| 9,662,821 B2 | 5/2017 | Clineff et al. |
| 9,725,613 B2 | 8/2017 | García et al. |
| 10,226,894 B2 | 3/2019 | Houben et al. |
| 10,272,664 B2 | 4/2019 | Hays et al. |
| 10,675,379 B2 | 6/2020 | Gatenholm |
| 11,186,736 B2 | 11/2021 | Martinez et al. |
| 11,826,951 B2 | 11/2023 | Boyer et al. |
| 2003/0059708 A1 | 3/2003 | Yamamura et al. |
| 2005/0056713 A1 | 3/2005 | Tisone et al. |
| 2008/0305012 A1 | 12/2008 | Camenisch |
| 2009/0003696 A1 | 1/2009 | Ishii et al. |
| 2009/0022791 A1 | 1/2009 | Obae et al. |
| 2010/0175759 A1 | 7/2010 | Ikushima |
| 2010/0200752 A1 | 8/2010 | Lee et al. |
| 2010/0206224 A1 | 8/2010 | Thurner et al. |
| 2011/0024699 A1 | 2/2011 | Lin et al. |
| 2011/0151482 A1 | 6/2011 | Emery et al. |
| 2013/0309295 A1 | 11/2013 | Gatenholm |
| 2014/0074274 A1 | 3/2014 | Douglas et al. |
| 2015/0013476 A1 | 1/2015 | Telimaa et al. |
| 2015/0045928 A1 | 2/2015 | Perez et al. |
| 2015/0050719 A1 | 2/2015 | Bammesberger et al. |
| 2015/0102351 A1 | 4/2015 | Kimura |
| 2015/0105891 A1 | 4/2015 | Golway et al. |
| 2015/0246482 A1 | 9/2015 | El-Siblani et al. |
| 2015/0290874 A1 | 10/2015 | Chen et al. |
| 2015/0375453 A1 | 12/2015 | Yost et al. |
| 2016/0236414 A1 | 8/2016 | Reese et al. |
| 2016/0243618 A1 | 8/2016 | Heugel et al. |
| 2016/0288414 A1 | 10/2016 | Ozbolat et al. |
| 2017/0031149 A1 | 2/2017 | Levin et al. |
| 2017/0079262 A1 | 3/2017 | Rowley et al. |
| 2017/0080641 A1 | 3/2017 | El-Siblani |
| 2017/0100899 A1 | 4/2017 | El-Siblani et al. |
| 2017/0172765 A1 | 6/2017 | Solorzano et al. |
| 2017/0199507 A1 | 7/2017 | Murphy et al. |
| 2017/0210077 A1 | 7/2017 | Ermoshkin et al. |
| 2017/0216498 A1 | 8/2017 | Kang et al. |
| 2017/0225393 A1 | 8/2017 | Shkolnik |
| 2017/0348458 A1 | 12/2017 | Kesti et al. |
| 2017/0368225 A1 | 12/2017 | Gatenholm |
| 2018/0071740 A1 | 3/2018 | Brueckner et al. |
| 2018/0273904 A1 | 9/2018 | Skardal |
| 2018/0281280 A1 | 10/2018 | Solorzano et al. |
| 2018/0297270 A1 | 10/2018 | Liu et al. |
| 2018/0326665 A1 | 11/2018 | Gatenholm et al. |
| 2018/0326666 A1 | 11/2018 | Kelly et al. |
| 2018/0341248 A1* | 11/2018 | Mehr ...................... B22F 10/00 |
| 2018/0345563 A1 | 12/2018 | Sternå et al. |
| 2018/0348247 A1 | 12/2018 | Ando |
| 2018/0370116 A1 | 12/2018 | Huang et al. |
| 2019/0016052 A1 | 1/2019 | Clark |
| 2019/0160203 A1 | 5/2019 | Gatenholm |
| 2019/0209738 A1 | 7/2019 | Gatenholm |
| 2019/0344500 A1 | 11/2019 | Côté |
| 2020/0070421 A1 | 3/2020 | Horn et al. |
| 2020/0071550 A1 | 3/2020 | Gaharwar et al. |
| 2020/0122135 A1 | 4/2020 | Abate et al. |
| 2020/0139623 A1 | 5/2020 | Kalpio et al. |
| 2020/0164103 A1 | 5/2020 | Gatenholm |
| 2020/0206385 A1 | 7/2020 | Gatenholm |
| 2020/0353691 A1* | 11/2020 | Martinez ................. C12M 25/14 |
| 2021/0001009 A1 | 1/2021 | Redwan et al. |
| 2021/0069964 A1 | 3/2021 | Boyer et al. |
| 2021/0179871 A1 | 6/2021 | Martinez et al. |
| 2022/0105676 A1 | 4/2022 | Boyer et al. |
| 2022/0161499 A1 | 5/2022 | Abushall et al. |
| 2023/0398259 A1 | 12/2023 | Gatenholm |

FOREIGN PATENT DOCUMENTS

| | | |
|---|---|---|
| CN | 111618302 A | 9/2020 |
| DE | 202015000178 U1 | 4/2015 |
| EP | 2199380 A2 | 6/2010 |
| EP | 1732746 B1 | 4/2011 |
| EP | 2808671 A1 | 12/2014 |
| EP | 2633032 B1 | 2/2015 |
| EP | 2916158 A1 | 9/2015 |
| EP | 2975115 A1 | 1/2016 |
| EP | 3366458 A1 | 8/2018 |
| EP | 3415300 A1 | 12/2018 |
| EP | 3463822 A1 | 4/2019 |
| EP | 3469004 A4 | 5/2020 |
| EP | 3799571 A1 | 4/2021 |
| EP | 3931532 A1 | 1/2022 |
| FI | 123988 B | 1/2014 |
| HR | PK20140564 A2 | 12/2015 |
| HR | PK20140564 B | 5/2017 |
| JP | 2000513258 A | 10/2000 |
| JP | 2005003610 A | 1/2005 |
| JP | 2010533855 A | 10/2010 |
| JP | 2013181167 A | 9/2013 |
| JP | 2013541956 A | 11/2013 |
| JP | 2018501845 A | 1/2018 |
| JP | 7053503 B2 | 4/2022 |
| KR | 101502236 B1 | 3/2015 |
| WO | 2004092672 A2 | 10/2004 |
| WO | 2008055533 A1 | 5/2008 |
| WO | 2008122661 A1 | 10/2008 |
| WO | 2009053100 | 5/2010 |
| WO | 2012051718 A1 | 4/2012 |
| WO | 2012056109 A2 | 5/2012 |
| WO | 2012056111 A2 | 5/2012 |
| WO | 2012071578 A2 | 5/2012 |
| WO | 2012056110 A3 | 6/2012 |
| WO | 2012024675 A9 | 2/2013 |
| WO | 2014049204 A1 | 4/2014 |
| WO | 2015066705 A1 | 5/2015 |
| WO | 2015101712 A1 | 7/2015 |
| WO | 2015164844 A1 | 10/2015 |
| WO | 2015175457 A1 | 11/2015 |
| WO | 2015148646 A3 | 1/2016 |
| WO | 2016073782 A1 | 5/2016 |
| WO | 2016091336 A1 | 6/2016 |
| WO | 2016092106 A1 | 6/2016 |
| WO | 2016100856 A1 | 6/2016 |
| WO | 2017040675 A1 | 3/2017 |
| WO | 2017109394 A1 | 6/2017 |
| WO | 2017109395 A1 | 6/2017 |
| WO | 2017115056 A1 | 7/2017 |

(56) References Cited

FOREIGN PATENT DOCUMENTS

| | | |
|---|---|---|
| WO | 2017152142 A1 | 9/2017 |
| WO | 2017184839 A1 | 10/2017 |
| WO | 2017210663 A1 | 12/2017 |
| WO | 2017214592 A1 | 12/2017 |
| WO | 2018119989 A1 | 7/2018 |
| WO | 2018169965 A1 | 9/2018 |
| WO | 2018187380 A1 | 10/2018 |
| WO | 2018234837 A1 | 12/2018 |
| WO | 2019043529 A1 | 3/2019 |
| WO | 2019109127 A1 | 6/2019 |
| WO | 2019145795 A2 | 8/2019 |
| WO | 2019246623 A9 | 2/2020 |
| WO | 2020077118 A1 | 4/2020 |
| WO | 2020086941 A1 | 4/2020 |
| WO | 2020094913 A1 | 5/2020 |
| WO | 2020157077 A2 | 8/2020 |
| WO | 2020165322 A1 | 8/2020 |
| WO | 2020176079 A1 | 9/2020 |
| WO | 2021231717 A1 | 11/2021 |
| WO | 2021243046 A1 | 12/2021 |
| WO | 2022192768 A1 | 9/2022 |
| WO | WO-2023026099 A1 * | 3/2023 |

OTHER PUBLICATIONS

Co-pending European Patent Application No. 17807642.8 Communication Pursuant to Rule 164(1) dated Jan. 27, 2020, 19 pages.
Co-pending European Patent Application No. 17807642.8 Communication Pursuant to Rules 161(2) and 162 EPC dated Feb. 1, 2019, 4 pages.
Co-pending European Patent Application No. 17807642.8 Response to Jan. 27, 2020 Communication Pursuant to Rule 164(1) filed Apr. 8, 2020, 3 pages.
Co-pending European Patent Application No. 17807642.8, Extended European Search Report dated Jun. 16, 2020, 21 pages.
Co-pending European Patent Application No. 17811137.3, Communication under Article 94(3) EPC dated Dec. 10, 2020, 6 pages.
Co-pending European Patent Application No. 17811137.3, Extended European Search Report dated Apr. 2, 2020, 9 pages.
Co-pending European Patent Application No. 17811137.3, Response to Apr. 1, 2020 Communication pursuant to Rules 70(2) and 70a(2) EPC filed Oct. 30, 2020, 11 pages.
Co-pending International Application No. PCT/EP2020/052062, International Search Report and Written Opinion, dated Aug. 24, 2020, 19 pages.
Co-pending International Application No. PCT/EP2020/053721, International Search Report and Written Opinion, dated May 18, 2020, 11 pages.
Co-pending International Application No. PCT/US19/55684, International Search Report and Written Opinion dated Jan. 28, 2020, 8 pages.
Co-pending International Application No. PCT/US19/58025, International Search Report and Written Opinion dated Feb. 6, 2020, 10 pages.
Co-pending International Patent Application No. PCT/US15/66755, International Preliminary Report on Patentability dated Jun. 20, 2017, 6 pages.
Co-pending International Patent Application No. PCT/US15/66755, International Search Report and Written Opinion dated Apr. 28, 2016, 8 pages.
Co-pending International Patent Application No. PCT/US17/035861 filed Jun. 3, 2017, International Preliminary Report on Patentability dated Dec. 4, 2018, 11 pages.
Co-pending International Patent Application No. PCT/US17/035861 International Search Report and Written Opinion dated Aug. 17, 2017, 14 pages.
Co-pending International Patent Application No. PCT/US17/036895, International Preliminary Report on Patentability dated Aug. 17, 2017, 7 pages.
Co-pending International Patent Application No. PCT/US17/036895, International Search Report and Written Opinion dated Sep. 6, 2017, 9 pages.
Co-pending International Patent Application No. PCT/US2017/035861 filed Jun. 3, 2017, International Search Report and Written Opinion dated Aug. 17, 2017.
Co-pending Japanese Application No. 2020-549630, English Version of Claims filed Nov. 27, 2020, 3 pages.
D. Gethin, A. Rees et al., "Studies on the 3D Printing of Nanocellulose Structures", Advances in Printing and Media Technology, vol. XLI(I), A2, (2014), 91-95.
Fink, Helen et al. Bacterial cellulose modified with xyloglucan bearing the adhesion peptide RGD promotes endothelial cell adhesion and metabolism—a promising modification for vascular grafts, Journal of Tissue Engineering and Regenerative Medicine, vol. 5, No. 6, Jun. 1, 2011, pp. 454-463.
Gatenholm P. et al. Bacteria fabricate 3D scaffolds for organ regeneration, Symposium 13: Biomedical research. New Biotechnology, Jul. 2014, vol. 31S, p. S52.
Guerreiro, Susana G. et al. Neonatal Human Dermal Fibroblasts Immobilized in RGD-Alginate Induce Angiogenesis. Cell Transplantation, 23, 2014, 945-957.
Helenius G, H. Bäckdahl, A. Bodin, U. Nanmark, P. Gatenholm, B. Risberg, In vivo Biocompatibility of Bacterial Cellulose, J. Biomed. Mater. Res. A., 76, 431-438, 2005.
Huh et al. "From 3D Cell Culture to Organs-on-Chips," Trends Cell Biol. Dec. 1, 2011 (Dec. 1, 2011), vol. 21,155.12, pp. 745-754.
J.A. Rowley, G. Madlambayan, D.J Mooney, Alginate hydrogels as synthetic extracellular matrix materials, Biomaterials 20 (1999), 45-53.
Jia et al. "Engineering Alginate as a Bioink for Bioprinting," Acta Biomater. Oct. 1, 2015 (Oct. 1, 2015), vol. 10, Iss. 10, pp. 4323-4331.
Johnson, H. Y. Chung et al. Bio-ink properties and printability for extrusion printing living cells. Biomater. Sci. 2013, 1, 763-773.
Kunt, Emrah Deniz "Microfactory Concept with Bilevel Modularity" Graduate School of Engineering and Natural Sciences, Sabanci University, Fall 2011, 194 pages.
Kuzmenko, Y, S. Saemfors, D. Haegg, and P. Gatenholm, Universal method for protein bioconjugation with hanocellulose scaffolds for increased cell adhesion. Mater. Sci. Eng., C,2013. 33(8): p. 4599-4607.
L.Nimeskern, et al., "Mechanical evaluation of bacterial nanocellulose as an implant material for ear cartilage replacement", Journal of the Mechanical Behaviour of Biomedical Materials, 22 (2013), 12-21.
Lee, K. Y. and Mooney, D. J. Alginate: Properties and biomedical applications. Progress in Polymer Science, 37, 2012, 106-126.
Markstedt et al. "3D Bioprinting Human Chondrocytes with Nanocellulose-Alginate Bioink—for Cartilage Tissue Engineering Applications," Bio Macromolecules, Mar. 25, 2015 (Mar. 25, 2015) vol. 16, Iss. 5, pp. 1489-1496.
Martinez Avila, Hector et al.. 3D bioprinting of human chondrocyte-laden nanocellulose hydrogels for patient-specific auricular cartilage regeneration. Bioprinting. vol. 1-2, Mar. 1, 2016, pp. 22-35.
Martinez, Hector Avila, S. Schwarz, E.M. Feldmann, A. Mantas, A. Von Bomhard, P. Gatenholm, and N. Rotter, Biocompatibility evaluation of densified bacterial nanocellulose hydrogel as an implant material for auricular cartilage regeneration. Appl. Microbiol. Biotechnol., 2014. 98(17): p. 7423-7435.
Michael, S. et al. Tissue Engineered Skin Substitutes Created by Laser-Assisted Bioprinting Form Skin-Like Structures in the Dorsal Skin Fold Chamber in Mice. PLOS. Mar. 4, 2013; vol. 8, No. 3, pp. 1-12; doi:10.1371/journal.pone.0057741.
Murphy S. V et al. 3D bioprinting of tissues and organs. Nature Biotechnology, Aug. 2014, vol. 32, No. 8, p. 773-785.
Nakamura et al. "Biomatrices and Biomaterials for Future Developments of Bioprinting and Biofabrication," Biofabrication, Mar. 10, 2010 (Mar. 10, 2010) vol. 2, Iss. 1, pp. 1-6.
Panwar et al. "Current Status of Bioinks for Micro-Extrusion-Based 3D Bioprinting Molecules," Molecules, May 25, 2016 (May 25, 2016) vol. 21, Iss. 6, pp. 1-26.

(56) References Cited

OTHER PUBLICATIONS

Petersen N, Gatenholm, P., Bacterial cellulose-based materials and medical devices: current state and perspectives, Applied Microbiology and Biotechnology, 91, 1277, 2011.
Qing, Gao et al. Coxial nozzle-assisted 3D bioprinting with built-in microchannels for nutrients delivery. Biomaterials, 61, 2015, 203-215.
Rutz et al. "A Multi-Material Bioink Method for 3D Printing Tunable, Cell-Compatible—Hydrogels," Adv Mater. Mar. 4, 2015 (Mar. 4, 2015), vol. 27, Iss. 9, pp. 1-18.
Salas, C et al. Nanocellulose properties and applications in colloids and interfaces. Current Opinion in Colloid and Interface Science. Oct. 30, 2014, vol. 19, No. 5, pp. 383-396.
Teelahti, Toimi "Implementing Additive Manufacturing in Microfactories." M.Sc. Thesis, Tampere University of Technology, 2014, 71 pages.
Ventola C.L. Medical Applications for 3D Printing: Current and Projected Uses. P&T, Oct. 2014, vol. 39 No. 10, p. 704-711.
Xu, Mingen et al. An cell-assembly derived physiological 3D model of the metabolic syndrome, based on adipose-derived stromal cells and a gelatin/alginate/fibrinogen matrix. Biomaterials 31 (2010) 3868-3877.
Zhou, Y; The Application of Ultrasound in 3D Bio-Printing. Molecules. May 5, 2016, vol. 21 No. 590; pp. 1-25.
(Abushall, Hany et al.) Co-Pending Application No. PCT/US19/19664, filed Feb. 26, 2019, Specification, Claims, Figures.
(Boyer, Christen et al.) Co-pending U.S. Appl. No. 17/011,767, filed Sep. 3, 2020, Specification, Claims, Figures.
(Gatenholm, Erik et al.) Co-pending International Application No. PCT/EP2020/052062, filed Jan. 28, 2020, Specification, Claims, Figures, 49 pages (See WO2020157077).
(Gatenholm, Paul) Co-pending U.S. Appl. No. 15/537,154, filed Jun. 16, 2017, Specification, Claims, Figures.
(Gatenholm, Paul) Co-pending U.S. Appl. No. 16/306,436, filed Nov. 30, 2018, Specification, Claims, Figures.
(Gatenholm, Paul) Co-pending U.S. Appl. No. 16/307,852, filed Dec. 6, 2018, Specification, Claims, Figures.
(Gatenholm, Paul) Co-pending U.S. Appl. No. 16/777,146, filed Jan. 30, 2020, Specification, Claims, Figures.
(Gatenholm, Paul) Co-pending U.S. Appl. No. 16/799,062, filed Feb. 24, 2020, Specification, Claims, Figures.
(Gatenholm, Paul) Co-pending European Application No. 17807642.8 filed Jan. 3, 2019, Specification, Claims, Figures.
(Gatenholm, Paul) Co-pending European Patent Application No. 15871191.1 filed Jul. 18, 2017, Specification, Claims, Figures (See WO2016100856).
(Gatenholm, Paul) Co-pending European Patent Application No. 17811137.3, filed Jan. 2, 2019, Claims (Attached), Specification, and Figures (See PCT/US17/036895).
(Gatenholm, Paul) Co-pending International Patent Application No. PCT/US15/66755 filed Dec. 18, 2015, published as WO 2016/100856 on Jun. 23, 2016, Specification, Claims, Figures.
(Gatenholm, Paul) Co-pending International Patent Application No. PCT/US17/035861 filed Jun. 3, 2017, published as WO 2017/210663 on Dec. 7, 2017, Specification, Claims, Figures.
(Gatenholm, Paul) Co-pending International Patent Application No. PCT/US17/036895, filed Jun. 9, 2017, which published as WO 2017/214592 on Dec. 14, 2017, Specification, Claims, Figures.
(Gatenholm, Paul) Co-pending Japanese Application No. 2018-564332, filed on Dec. 7, 2018, Specification, Claims, and Figures (see PCT/US17/36895).
(Gatenholm, Paul) Co-pending Japanese Application No. 2019-516082 filed Nov. 30, 2018, Specification, Claims, Figures (see PCT/US17/35861).
(Martinez, Hector et al.) Co-Pending U.S. Appl. No. 17/048,755, filed Oct. 15, 2020, Specification, Claims, Figures.
(Martinez, Hector et al.) Co-pending International Application No. PCT/EP2020/053721, filed Feb. 13, 2020, Specification, Claims, Figures, 46 pages (See WO2020/165322).
(Martinez, Hector et al.) Co-pending International Application No. PCT/US19/55684, filed Oct. 10, 2019, Specification, Claims, Figures.
(Redwan, Adel Itadele Namro et al.) Co-pending International Application No. PCT/US19/58025, filed Oct. 25, 2019, Specification, Claims, Figures.
(Redwan, Adel Itedale Namro et al.) Co-Pending U.S. Appl. No. 16/979,452, filed Sep. 9, 2020, Specification, Claims, Figures.
(Redwan, Adel Itedale Namro et al.) Co-pending European Patent Application No. 19874873.3 filed Dec. 29, 2020, Specification and Figures (See PCT/US2019/058025) and amended claims (3 pages).
(Redwan, Adel Itedale Namro et al.) Co-pending Japanese Application No. 2020-549630, filed Sep. 15, 2020, Specification, Claims, Figures (see PCT/US19/58025).
(Redwan, Adel Itedale Namro et al.) Co-pending Korean Application No. 10-2020-7031999 filed Nov. 5, 2020, Specification, Claims, and Figures (See PCT/2019/058025).
(Thayer, Patrick et al.) Co-pending Application No. PCT/IB2019/000215, filed Jan. 25, 2019, Specification, Claims, and Figures.
Ahadian et al. "Bioconjugated Hydrogels for Tissue Engineering and Regenerative Medicine," Bioconjuoate Chem. Jul. 15, 2015 (Jul. 15, 2015) vol. 26, Iss. 10, pp. 1984-2001.
Andrade et al. "Improving the Affinity of Fibroblasts for Bacterial Cellulose Using .—Carbohydrate-Binding Modules Fused to RGD," Journal of Biomedical Materials Research. Jan. 22, 2009 (Jan. 22, 2009) vol. 92, Iss. 1, pp. 9-17.
Bäckdahl, H., Esguerra, M., Delbro, D., Risberg, B., and Gatenholm, P., Engineering microporosity in bacterial cellulose scaffolds, Journal of Tissue Engineering and Regenerative Medicine, 2 (6), 320-330 (2008).
Bovine Collagen Solution, Sigma Aldrich, 2020, https://www.sigmaaldrich.com/catalog/product/aldrich/804614?lang=en&region=US. (International Search Report of PCT/US2019/055684 dated Jan. 28, 2020 indicates this reference was retrieved as early as Jan. 6, 2020. This copy retrieved Apr. 14, 2020.).
Co-pending U.S. Appl. No. 15/537,154 Non-Final Office Action dated Feb. 27, 2019, 6 pages.
Co-pending U.S. Appl. No. 15/537,154 Notice of Allowance dated Apr. 28, 2020, 6 pages.
Co-pending U.S. Appl. No. 15/537,154 Official Interview Summary dated Mar. 13, 2019, 3 pages.
Co-pending U.S. Appl. No. 15/537,154 Preliminary Amendment filed Jun. 16, 2017, 7 pages.
Co-pending U.S. Appl. No. 15/537,154 Response to Feb. 27, 2019 Non-Final Office Action, filed Mar. 18, 2019, 6 pages.
Co-pending U.S. Appl. No. 15/537,154 Response to Oct. 18, 2018 Restriction Requirement, dated Dec. 18, 2018, 7 pages.
Co-pending U.S. Appl. No. 15/537,154 Restriction Requirement dated Oct. 18, 2018, 8 pages.
Co-pending U.S. Appl. No. 15/537,154 Supplemental Notice of Allowance dated May 5, 2020, 3 pages.
Co-pending U.S. Appl. No. 16/306,436, Preliminary Amendment filed Nov. 30, 2018, 5 pages.
Co-pending U.S. Appl. No. 16/307,852, Preliminary Amendment filed Dec. 6, 2018, 8 pages.
Co-pending U.S. Appl. No. 16/777,146, Preliminary Amendment, filed Jan. 30, 2020, 5 pages.
Co-Pending U.S. Appl. No. 16/979,452, Preliminary Amendment filed Sep. 9, 2020, 8 pages.
Co-Pending U.S. Appl. No. 16/979,452, Restriction Requirement dated Mar. 10, 2021, 11 pages.
Co-Pending U.S. Appl. No. 17/048,755, Preliminary Amendment filed Oct. 19, 2020, 7 pages.
Co-pending Application No. PCT/IB2019/000215, International Preliminary Report on Patentability, 14 pages.
Co-pending Application No. PCT/IB2019/000215, International Search Report and Written Opinion dated Feb. 9, 2019 and Written Opinion dated Jul. 4, 2019, 20 pages.
Co-Pending Application No. PCT/US19/19664, International Search Report and Written Opinion dated Jun. 6, 2019, 11 pages.
Co-pending European Application No. 17807642.8, Response to Jul. 3, 2020 Communication pursuant to Rules 70(2) and 70a(2) EPC filed Jan. 13, 2021, 12 pages.

(56) References Cited

OTHER PUBLICATIONS

Co-pending European Patent Application No. 15871191.1, File History, Nov. 2019 to Feb. 2020, 30 pages.
Co-pending European Patent Application No. 15871191.1, File History, Oct. 2018 to Jul. 2019, 28 pages.
Co-pending European Patent Application No. 15871191.1, Letter and Communication pursuant to Rule 114(2) EPC, dated Jun. 12, 2018, 7 pages.
(Abushall, Hany et al.) Co-Pending U.S. Appl. No. 17/434,321, filed Aug. 26, 2021, Specification, Claims, and Figures.
(Abushall, Hany et al.) Co-Pending European Application No. 19917298.2, filed Aug. 5, 2021, Specification, Claims, Figures (See WO 2020/176079).
(Boyer, Christen et al.) Co-pending U.S. Appl. No. 17/554,789, filed Dec. 17, 2021, Specification, Claims, Figures.
(Martinez, Hector et al.) Co-Pending Application No. PCT/US22/20148, filed Mar. 14, 2022, Specification, Claims, Figures.
(Redwan, Adel Itedale Namro et al.) Co-pending Japanese Application No. 2022-035620, filed Mar. 8, 2022, Specification, Claims, Figures (see PCT/US19/58025).
(Redwan, Adel Itedale Namro et al.) Co-pending Korean Application No. 10-2022-7017436 filed May 24, 2022, Specification, Claims, and Figures (See PCT/2019/058025 for English Translation).
Apelgren, P. et al., PLoS ONE, "Chondrocytes and stem cells in 3D-bioprinted structures create human cartilage in vivo", published Dec. 13, 2017, vol. 12, No. 12, 16 pages.
Bodin, A. et al., "Modification of Nanocellulose with a Xyloglucan-RGD Conjugate Enhances Adhesion and Proliferation of Endothelial Cells: Implications for Tissue Engineering", Biomacromolecules 2007, 8, 3697-3704, 8 pages.
Chang, R. et al., "Direct Cell Writing of 3D Microorgan for In Vitro Pharmacokinetic Model", Tissue Engineering: Part C, vol. 14, No. 2, 2008, 11 pages.
Co-pending U.S. Appl. No. 16/306,436, Final Office Action dated May 17, 2022, 17 pages.
Co-pending U.S. Appl. No. 16/306,436, Non-Final Office Action dated Nov. 18, 2021, 13 pages.
Co-pending U.S. Appl. No. 16/306,436, Response to Jun. 28, 2021 Restriction Requirement, filed Aug. 27, 2021, 5 pages.
Co-pending U.S. Appl. No. 16/306,436, Response to Nov. 18, 2021 Non-Final Office Action, dated Feb. 17, 2022, 7 pages.
Co-pending U.S. Appl. No. 16/306,436, Restriction Requirement dated Jun. 28, 2021, 11 pages.
Co-pending U.S. Appl. No. 16/307,852, Response to Apr. 26, 2022 Restriction Requirement, dated Aug. 22, 2022, 5 pages.
Co-pending U.S. Appl. No. 16/307,852, Restriction Requirement, dated Apr. 26, 2022, 9 pages.
Co-Pending U.S. Appl. No. 16/979,452, Final Office Action dated Jul. 13, 2021, 18 pages.
Co-Pending U.S. Appl. No. 16/979,452, Final Office Action dated Jun. 3, 2022, 15 pages.
Co-Pending U.S. Appl. No. 16/979,452, Non-Final Office Action dated Dec. 16, 2021, 16 pages.
Co-Pending U.S. Appl. No. 16/979,452, Non-Final Office Action dated Mar. 30, 2021, 16 pages.
Co-Pending U.S. Appl. No. 16/979,452, Response to Dec. 16, 2021 Non-Final Office Action, dated May 16, 2022, 15 pages.
Co-Pending U.S. Appl. No. 16/979,452, Response to Jul. 13, 2021 Final Office Action, filed Nov. 15, 2021, 8 pages.
Co-Pending U.S. Appl. No. 16/979,452, Response to Jun. 3, 2022 Final Office Action, dated Sep. 6, 2022, 11 pages.
Co-Pending U.S. Appl. No. 16/979,452, Response to Mar. 10, 2021 Restriction Requirement dated Mar. 17, 2021, 3 pages.
Co-Pending U.S. Appl. No. 16/979,452, Response to Mar. 30, 2021 Non-Final Office Action dated Jun. 24, 2021, 8 pages.
Co-Pending U.S. Appl. No. 17/011,767, Final Office Action dated Jul. 20, 2022, 16 pages.
Co-pending U.S. Appl. No. 17/011,767, Non-Final Office Action dated Mar. 4, 2022, 49 pages.
Co-pending U.S. Appl. No. 17/011,767, Response to Mar. 4, 2022 Non-Final Office Action, dated Jul. 5, 2022, 8 pages.
Co-pending U.S. Appl. No. 17/011,767, Response to Oct. 21, 2021 Restriction Requirement, dated Dec. 11, 2021, 2 pages.
Co-pending U.S. Appl. No. 17/011,767, Restriction Requirement dated Oct. 21, 2021, 6 pages.
Co-Pending U.S. Appl. No. 17/048,755, Non-Final Office Action dated Jun. 17, 2021, 11 pages.
Co-Pending U.S. Appl. No. 17/048,755, Notice of Allowance dated Aug. 11, 2021, 10 pages.
Co-Pending U.S. Appl. No. 17/048,755, Response to Jun. 17, 2021 Non-Final Office Action dated Jul. 2, 2021, 8 pages.
Co-Pending U.S. Appl. No. 17/048,755, Response to May 13, 2021 Restriction Requirement, filed May 20, 2021, 2 pages.
Co-Pending U.S. Appl. No. 17/048,755, Restriction Requirement, dated May 13, 2021, 7 pages.
Co-Pending U.S. Appl. No. 17/434,321, Preliminary Amendment filed Aug. 26, 2021, 7 pages.
Co-Pending Application No. PCT/US22/20148, International Search Report and Written Opinion dated Jun. 29, 2022, 13 pages.
Co-Pending European Application No. 19917298.2, Amended Claims filed Mar. 25, 2022, 13 pages.
Co-pending European Patent Application No. 17811137.3, Response to Dec. 10, 2020 Communication under Article 94(3) EPC, filed Jun. 21, 2021, 15 pages.
Co-pending European Patent Application No. 19874873.3, Extended European Search Report, dated Feb. 8, 2022, 10 pages.
Co-pending European Patent Application No. 19874873.3, Response to the Feb. 25, 2022 Communication Pursuant to Rules 70(2) and 70a(2) EPC, dated Sep. 7, 2022, 11 pages.
Co-pending Japanese Application No. 2018-564332 Certificate of Patent 7053503, date of registration Apr. 4, 2022, 2 pages.
Co-pending Japanese Application No. 2018-564332, Office Action dated May 14, 2021, 9 pages and English Translation, 10 pages.
Co-pending Japanese Application No. 2018-564332, Response to May 14, 2021 Office Action filed Oct. 13, 2021, 6 pages and English Translation of Amended Claims, 5 pages.
Co-pending Japanese Application No. 2019-516082, Final Office Action dated Dec. 16, 2021 (3 pages) and English Translation (4 pages).
Co-pending Japanese Application No. 2019-516082, First Office Action dated Mar. 1, 2021 (3 pages) and English Translation (4 pages).
Co-pending Japanese Application No. 2019-516082, Response to Dec. 16, 2021 Final Office Action, dated Jun. 17, 2022 (9 pages) and English Translation (9 pages).
Co-pending Japanese Application No. 2019-516082, Response to First Office Action filed Aug. 2, 2021 (9 pages) and English Version (8 pages).
Co-pending Japanese Application No. 2020-549630, Office Action dated Apr. 18, 2022 (4 pages) and English Translation (5 pages).
Co-pending Japanese Application No. 2020-549630, Office Action dated Aug. 18, 2022 (3 pages) and English Translation (4 pages).
Co-pending Japanese Application No. 2020-549630, Office Action dated Dec. 9, 2021 (4 pages) and English Translation (4 pages).
Co-pending Japanese Application No. 2020-549630, Office Action dated Jun. 21, 2021 (6 pages) and English Translation (7 pages).
Co-pending Japanese Application No. 2020-549630, Response to Apr. 18, 2022 Office Action, dated Jul. 15, 2022 (6 pages) and English Version (6 pages).
Co-pending Japanese Application No. 2020-549630, Response to Dec. 9, 2021 Office Action, filed Mar. 9, 2022 (6 pages) and English Translation of the Amended Claims (4 pages).
Co-pending Japanese Application No. 2020-549630, Response to Jun. 21, 2021 Office Action, filed Nov. 19, 2021 (9 pages) and English Translation of the Amended Claims (4 pages).
Co-pending Korean Application No. 10-2020-7031999 Office Action dated Aug. 25, 2021 (10 pages) with English translation (9 pages).
Co-pending Korean Application No. 10-2020-7031999 Office Action dated Feb. 23, 2022 (4 pages) with English translation (3 pages).
Co-pending Korean Application No. 10-2020-7031999 Response to Aug. 25, 2021 Office Action, filed Nov. 25, 2021 (25 pages) with English translation of the amended claims (5 pages).

(56) References Cited

OTHER PUBLICATIONS

Co-pending Korean Application No. 10-2020-7031999 Voluntary Amendment filed Apr. 2, 2021 (15 pages) with English version of the amended claims (5 pages).
Co-pending Korean Application No. 10-2022-7017436, Remarks and Claims as filed (11 pages) May 24, 2022, with English version (9 pages).
Halper, J.; Kjaer, M. (2014) Chapter 3: Progress in Heritable Soft Connective Tissue Diseases. Advances in Experimental Medicine and Biology, vol. 802, 26 pages.
Kumar, A. et al. Carbohydrate Polymers, "Application of xanthan gum as polysaccharide in tissue engineering: A review", published online Oct. 5, 2017, vol. 180 pp. 128-144.
Memic, Adnan et al. "Bioprinting technologies for disease modeling", Biotechnol Lett (2017) 39:1279-1290, 12 pages.
Schuurman, W. et al., Macromolecular Bioscience, "Gelatin-Methacrylamide Hydrogels as Potential Biomaterials for Fabrication of Tissue-Engineered Cartilage Constructs", 2013, vol. 13, pp. 551-561.
Shariati et al., (2015) Hydrogels for Cell Encapsulation and Bioprinting. In: Turksen K. (eds) Bioprinting in Regenerative Medicine. Stem Cell Biology and Regenerative Medicine. Springer, Cham., pp. 89-108.
Tuan, R. S. et al., "Skin and Bones (and Cartilage): The Dermal Fibroblast Connection", NIH Public Access (pp. 1-5) of Nat Rev Rheumatol. 2009, 5(9): 471-472, 5 pages.
Turksen, K. (editor) Bioprinting in Regenerative Medicine. Stem Cell Biology and Regenerative Medicine. Springer, Cham., 2015, 148 pages.
Zhao, Yu et al. "Three-dimensional printing of Hela cells for cervical tumor model in vitro", Biofabrication, 6, 2014, 035001, 10 pages.
Co-pending U.S. Appl. No. 16/307,852, Election of Species Requirement, dated Oct. 5, 2022, 7 pages.
Co-pending U.S. Appl. No. 16/307,852, Response to Oct. 5, 2022 Election of Species Requirement, dated Dec. 5, 2022, 5 pages.
Co-pending U.S. Appl. No. 16/799,062, Restriction Requirement dated Jan. 5, 2023, 6 pages.
Co-Pending U.S. Appl. No. 16/979,452, Non-Final Office Action dated Oct. 26, 2022, 14 pages.
Co-pending U.S. Appl. No. 17/011,767, Non-Final Office Action dated Nov. 16, 2022, 20 pages.
Co-pending U.S. Appl. No. 17/011,767, Response to Jul. 20, 2022 Final Office Action, dated Oct. 19, 2022, 8 pages.
Co-Pending European Application No. 19917298.2, Extended European Search Report dated Sep. 8, 2022, 9 pages.
Co-pending European Patent Application No. 19874873.3, Communication pursuant to Article 94(3) EPC, dated Dec. 8, 2022, 6 pages.
Co-pending Japanese Application No. 2019-516082, Decision to Grant dated Oct. 26, 2022, 4 pages.
Co-pending Japanese Application No. 2020-549630, Decision of Rejection dated Dec. 12, 2022 (1 page) and English Translation (2 pages).
Co-pending Japanese Application No. 2020-549630, Response to Aug. 18, 2022 Office Action dated Nov. 4, 2022 (7 pages) and English Translation of the claims (3 pages).
Co-pending Japanese Application No. 2022-035620, Voluntary Amendment dated Oct. 24, 2022 (5 pages) and English Translation of the Claims (10 pages).
Co-pending U.S. Appl. No. 16/307,852, Response to Jun. 9, 2023 Final Office Action, dated Nov. 8, 2023, 7 pages.
Co-pending U.S. Appl. No. 16/777,146, Non-Final Office Action dated Dec. 7, 2023, 13 pages.
Co-Pending U.S. Appl. No. 16/979,452, Response to Oct. 3, 2023 Non-Final Office Action, dated Dec. 21, 2023, 13 pages.
Co-pending Japanese Application No. 2022-035620, Office Action dated Oct. 24, 2023 (7 pages) and English Translation of the Claims (8 pages).
Co-pending Korean Application No. 10-2022-7017436, Office Action dated Oct. 23, 2023 (9 pages) and English translation (9 pages).

\* cited by examiner

SYSTEMS AND METHODS FOR OPTICAL ASSESSMENTS OF BIOINK PRINTABILITY

CROSS-REFERENCE TO RELATED APPLICATIONS

The present application is a National Stage application under 35 U.S.C. 371 of International Application No. PCT/IB2019/000215, filed Jan. 25, 2019, which application relies on the disclosure of and claims priority to and the benefit of the filing date of U.S. Provisional Application No. 62/622,650 filed Jan. 26, 2018, the disclosures of which are hereby incorporated by reference in their entireties.

BACKGROUND OF THE INVENTION

Field of the Invention

The present invention relates to the fields of 3D printing and bioprinting. More particularly, embodiments of the present invention relate to optically-based systems and methods which allow for assessments of bioink printability.

Description of Related Art

A 3D bioprinter is a machine or device that spatially deposits, cross-links, or assembles biomaterials known as bioinks to fabricate tissue-like structures that are utilized in medical therapeutic, drug discovery, research, and tissue engineering fields. Bioprinters utilize materials known as bioinks to assemble multilayered three-dimensional structures or single layered two-dimensional patterns via extruded filaments, deposited droplets, or controlled cross-linking. Bioprinting utilizes 3D printing and 3D printing—like techniques to combine cells, growth factors, and biomaterials to fabricate constructs that maximally imitate natural tissue characteristics and can be utilized in applications such as drug evaluation and discovery, tissue and organ engineering, studying cells in a 3D environment, and recapitulating multifaceted native architectures.

The resulting characteristics of a bioink are highly dependent on both the bioink composition and the printing parameters utilized during the fabrication process. The overall quantification of the relationship between the resulting filament characteristics and the printing parameters is known as the printability of the bioink. Materials that are suitable for 3D bioprinting applications are distinct from traditional 3D printing materials. These materials, known as bioinks, can be defined by two qualities. The first is the ability to support and maintain cell viability during and after the printing process, the second is maintenance of structure and resulting filament characteristics after deposition and cross-linking (if applicable). As available bioinks increase there is a need for complementary techniques and metrics to validate a 3D bioprinted structure and bioinks.

SUMMARY OF THE INVENTION

Embodiments of the present invention provide systems and methods for optical assessments of bioink printability. The systems and methods include the use of hardware such as bioprinter or 3D printer systems, optical imaging devices, and standardized or customizable optical targets to enable the evaluation of bioink printability. The optical targets are developed and fabricated from 3D printable materials for the establishment of comparison and calibration standards based on "nozzle fidelic" or other materials such as those with well characterized thermosensitivity, cross-linking behavior, stability, or other relative properties. The optical targets make it possible to rapidly compare and evaluate bioink printability and can be easily customized and tailored for specific applications.

Additional embodiments and their features will be elaborated in the foregoing Detailed Description.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Definitions:

The following definitions are provided to facilitate understanding of certain terms provided in this specification. For other terms not defined herein, the ordinary meaning as recognized by an ordinarily-skilled artisan should be applied.

Optical Imaging Apparatus: Optical imaging is the use of light as an investigational imaging technique for medical and other applications. Examples include optical microscopy, spectroscopy, endoscopy, scanning laser ophthalmoscopy, and optical coherence tomography. According to this disclosure, the optical imaging apparatus includes one or more sensors and/or cameras for capturing images and/or video.

Droplet: A droplet is a structure that is formed when a material, for example, a bioink, is extruded at a single location on the print surface. The printhead does not translate in the x-y plane (where the x-y plane is the print surface), only in the z-direction, if necessary. Depending on the composition of the bioink, the resultant shape is typically circular or eclipse in shape when observed from above with an eccentricity between 0 and 1, and a minimum volume of 1 nL. A droplet can also be deposit through contactless bioprinting or printing techniques such as the use of an inkjet printing mechanism or an electrical field.

Printed filament: A printed filament is a structure that is formed when a bioink is extruded across the print surface where the printhead translates along waypoints to result in a non-enclosed structure. The printhead translates in the x-y plane (where the x-y plane is the print surface), with the nozzle positioned above the surface in the z-axis at a height between 10% and 500% of the nozzle inner diameter. A printed filament structure typically has a minimum total length to width ratio of 1 and a maximum of 100000.

Geometric structure: A geometric structure is a structure that is formed when a bioink is extruded across the print surface during printhead translation along waypoints and intersects or contacts the existing structure to enclose an area. The printhead translates in the x-y plane (where the x-y plane is the print surface), with the nozzle positioned above the surface in the z-axis at a height between 10% and 500% of the nozzle inner diameter. These geometric structures have a minimum of 0 vertices and 1 edge and enclose an area. The angle between subsequent edges at vertices can range from 0.001 degree to 179.99 degrees.

Infill Pattern: An infill pattern is a structure that is formed when a bioink is extruded across a print surface during printhead translation along waypoints in a fashion to fill in a printed geometric shape. The printhead translates in the x-y plane (where the x-y plane is the print surface), with the nozzle positioned above the surface in the z-axis at a height between 10% and 500% of the nozzle inner diameter. The infill pattern typically provides structural support, porosity, or generates micro-architectures that mimic native tissue structure or serve as a framework for tissue regeneration. The spacing between the centers of adjacent filaments (x-y positioning on the print surface) can range from a distance equal to the filament diameter to 5 times, 10 times, or 100 times the filament diameter. For example, for a 150 µm filament, the spacing between the centers of adjacent filaments can be 150 µm, up to 0.75 mm, up to 1.5 mm, or up to 15 mm. Infill pattern can also include multiple material or bioink types that are arranged or encapsulated within the broader structure. Deposited filaments such as those composed of sacrificial materials such as PEO (poly(ethylene oxide)), PEG (poly(ethylene glycol)), Pluronics® (poloxamers), and/or gelatin based bioink, can be used. Sacrificial materials which dissolve or are otherwise not permanent or present in the final structure are useful, for example, for creating void regions, conduits, and/or perfusable channels and can also be considered an infill pattern. These sacrificial materials may comprise 0% to 100% of the infill pattern, such as from 5-90%, or 15-75%, or 30-60%, or 10-80%, or 20-50%, for example.

Multilayered Structure: A multilayered structure is a structure that is generated when a bioink is extruded on top of a previously deposited structure. The printhead translates in the x-y plane (where the x-y plane is the previously deposited structure), with the nozzle positioned above the previously deposited structure in the z-axis at a height between 10% and 500% of the nozzle inner diameter. Droplets, printed filaments, geometric shapes, and infill patterns can all be printed on the previously printed layer. The number of previously printed layers is a minimum of 1 to achieve the maximum build height set by the bioprinter system being utilized.

Bioink printability: The overall quantification of the relationship between the resulting filament characteristics and the printing parameters is known as bioink printability. The resulting characteristics of a bioink are highly dependent on both the bioink composition and the printing parameters utilized during the fabrication process. These defined metrics can be utilized to compare and contrast different types of bioinks and printing conditions of bioinks.

Printability metrics of bioinks: Printability metrics of bioinks can include the resultant filament thickness, uniformity, roughness, continuity, color, opacity, and geometry at intersections and other directional changes that is quantifiable during and after the printing process and directly related to the utilized printing parameters.

Printing parameters of bioinks: Printing parameters of bioinks include applied pressure, strain, force, or flow, translation rate, start delay, stop delay, overshoot, undershoot of the printhead during the printing process, temperature of the bioink, temperature of the print surface, material of the print surface, layer height, infill pattern and density, the nozzle diameter, nozzle shape, and nozzle material.

Nozzle fidelic: A nozzle fidelic material is a bioink that can generate a stable filament with a diameter between 100% and 125% of the nozzle inner diameter. For example, a bioink capable of producing a filament of 500 µm from a nozzle with a 400 µm inner diameter is considered a nozzle fidelic material for that particular nozzle and conditions.

Real-time mode: In real-time mode, the system processes and compares the data captured by the optical imaging apparatus to the reference data already present in the system and/or the information provided by the user of the 3D bioprinter in actual time or within milliseconds of capturing the image and/or live video feed.

Layer-by-layer mode: In layer-by-layer mode, the system processes and compares the data captured by the optical imaging apparatus to the reference data already present in the system and/or the information provided by the user of the 3D bioprinter after a layer of the 3D build has been printed.

Process Algorithms: A process algorithm is any algorithm or protocol that receives an image or video from the optical imaging apparatus and identifies a point of interest, isolates it, and quantifies various metrics.

Learning Algorithms: A learning algorithm is any algorithm that receives data from or during a measurement and utilizes data from a broader dataset to automatically improve the existing print or future prints.

Database: A database is a repository of data consisting of bioink printability and properties, results of previous prints, and previous print adjustments that can be accessed by and shared across individual bioprinter systems to provide reference points and aid in the development of process and/or learning algorithms.

Printing Instructions: Printing instructions are computer code or computer-executable instructions which can include G-code files, STL files, text files, or manual inputs.

Microwell Plate: A microwell plate is a flat plate with more than one well used as small test tubes. It is typically used in analytical research and clinical diagnostic testing laboratories.

Embodiments of the present invention provide systems and methods for optical assessments of bioink printability. In one embodiment, a 3D printer or bioprinter system is provided that includes a plurality of components that work in concert to optically characterize one or more printability metrics of the 3D printer or bioprinter.

Provided is a 3D printer or bioprinter comprising one or more of the following:

(a) one or more optical imaging apparatus;

(b) one or more control element;

(c) one or more processor and communication interface operably connecting and capable of communicating printability data from the one or more optical imaging apparatus to the one or more control element; and (d) a non-transitory computer-readable storage media comprising:

(1) one or more process algorithms capable of analysis of the printability data from one or more images and/or video of a first printed structure produced by the 3D printer or bioprinter; and (2) optionally, one or more learning algorithms capable of modifying and adjusting printing instructions and/or parameters based on one or more printability metrics to achieve a second printed structure.

According to embodiments, the 3D printer or bioprinter can include one or more additional components such as motors, printheads, print bed, substrates for printing, printed structures, cartridges, syringes, platforms, lasers, operating controls, power cables, and USB ports/connectors and/or cables.

According to embodiments, the 3D printer or bioprinter is in communication with or integrated with a database where printability analysis can be shared and compared across batches and users.

According to embodiments, the optical imaging apparatus includes one or more infrared, near-infrared, visible, or UV sensors or cameras. The imaging apparatus can be capable of obtaining high definition (HD) images, such as HD digital images.

Figure 1:
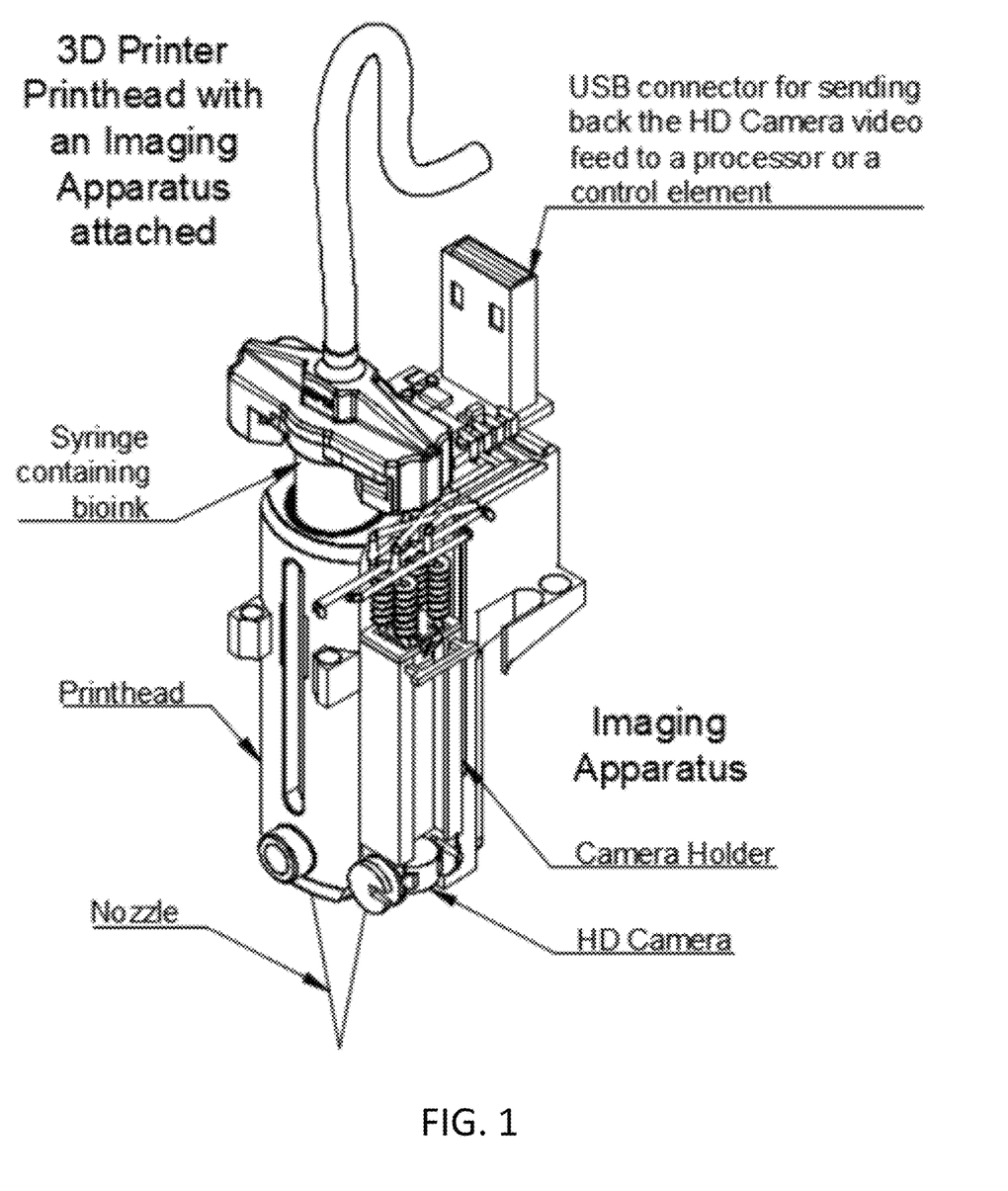
FIG. 1 is a schematic drawing of a printhead of a 3D printer or bioprinter according to an embodiment.

In embodiments, the imaging apparatus can be mounted to a printhead, whether a single-function or multi-function printhead. As shown in FIG. 1, the imaging apparatus can comprise an HD camera mounted to the side of one or more printhead that is or is not also capable of printing bioink. The camera can be disposed in a position where the optical elements of the camera are oriented toward the print bed of the 3D printer or bioprinter, or other printing surface. In this manner, the camera can obtain still and/or video images of the print bed or printing surface and/or the structure being formed on the print bed or printing surface, before, during or after the printing. In embodiments, the imaging apparatus is disposed on a printhead in a manner such that the imaging apparatus is positioned to the side, above, and/or below the nozzle of the printhead through which bionk is disposed during the printing process. The still and/or video images captured by the camera can be transmitted back to a processing and/or control unit located inside and/or outside the 3D bioprinter. In principle, one or more than one camera can be mounted in and/or on any part of the printhead.

According to embodiments, the one or more printability metrics can be chosen from one or more of filament thickness, uniformity, roughness, continuity, color, opacity, and/or geometry at intersections and/or other directional changes.

According to embodiments, the printing parameters can be chosen from one or more of applied pressure, strain, force, or flow, printhead translation rate, bioink temperature, bioink composition, print surface temperature, layer height, infill pattern and density, nozzle diameter, nozzle shape, and/or nozzle material.

Figure 2:
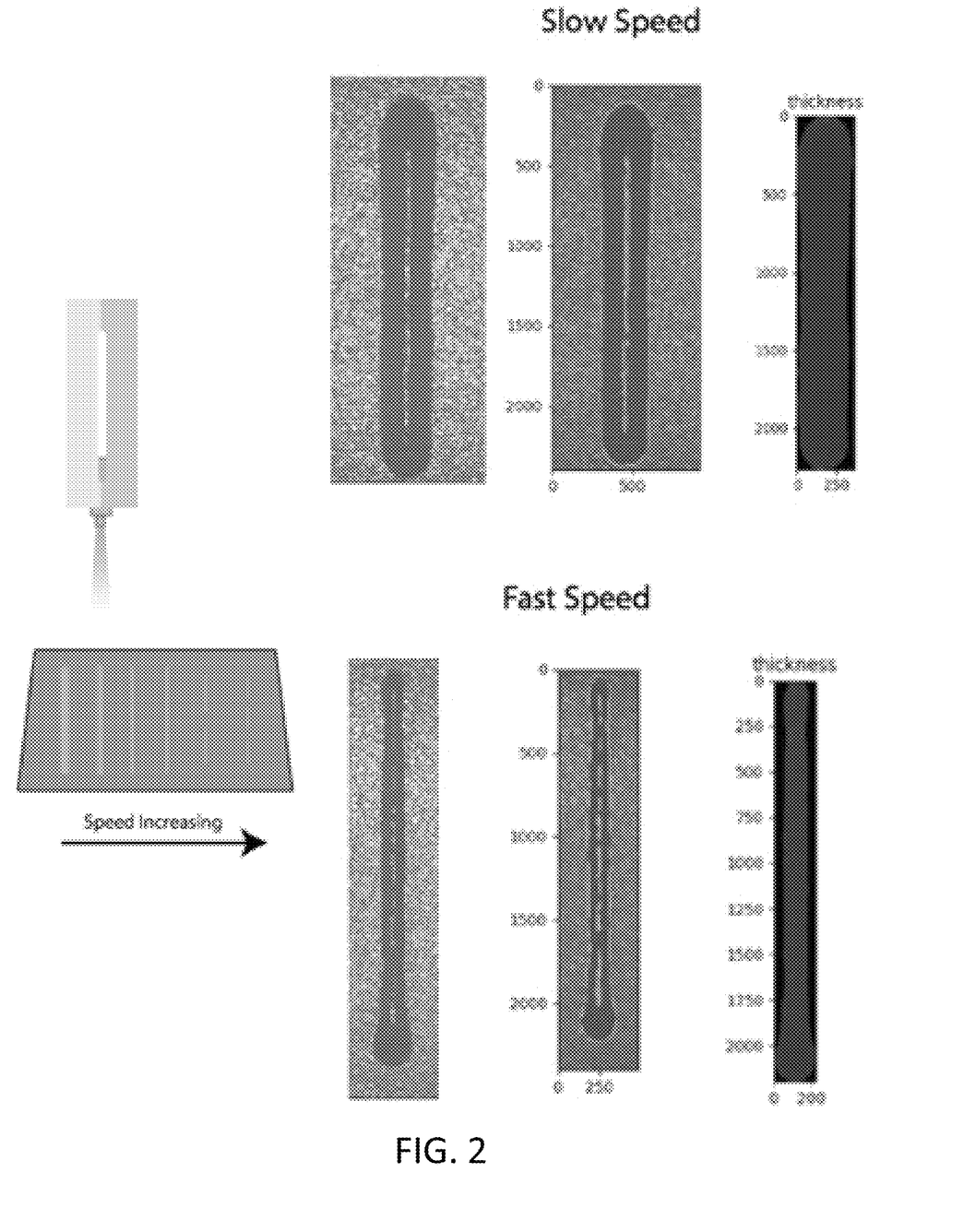
FIG. 2 is a drawing of an ink/bioink pressure calibration process according to an embodiment.

A calibration process according to embodiments of the invention is shown in FIG. 2. The 3D printer or bioprinter is programmed to deposit a bioink under both variable and constant printing parameters. For this example, all parameters will be held constant with the exception of printing pressure and translation rate. The user provides printing instructions or the 3D printer or bioprinter generates printing instructions from user input or an algorithm that varies a particular printing parameter. The printing instructions deposit filaments that are generated from distinct parameters. The bioprinter or 3D printer then utilizes the optical imaging apparatus to capture an image. These are then presented to the user and/or entered into a processing and/or learning algorithm for evaluation as a whole, which algorithm(s) then recommend optimal parameters for the desired resulting diameter or other characteristic.

According to embodiments, the printed structure is or includes a droplet, a linear or curved filament, a geometric shape, an infill pattern, and/or multilayered structure deposited using a bioink. In combination with the printer elements, the printed structured can serve as an optical or calibration target to allow rapid comparisons to known standard printable materials and/or internal controls.

For example, the optical or calibration target can be or can include a non-thermoresponsive filament, a thermoresponsive filament, or both. In addition or alternatively, the optical or calibration target can be or can be comprised of "nozzle fidelic" printable materials, such as thermoplastics or silicone so the user can fabricate customizable printability targets. Examples of suitable thermoplastics include polyethylene, polypropylene, polyvinyl chloride (PVC), and polystyrene. Further, the optical or calibration target can be or can include materials that exhibit a well characterized thermosensitivity as a calibration target which can be analyzed using software and thermal sensors or cameras such as infrared-detecting sensors and/or cameras. Still further, the printability data generated from the calibration target using such materials can be used to calibrate the printing parameters and adjust the printing instructions, such as provided by G-code, to optimize printing.

According to embodiments, printing instructions which include G-code files, STL files, text files, or manual inputs can be provided by the user or generated through software.

According to embodiments, the optical imaging apparatus can be provided as an independent printhead that does not deposit bioink and/or the structure that is being analyzed. In embodiments, the optical imaging apparatus can be provided as an independent printhead that does deposit bioink and/or the structure that is being analyzed.

Figure 3:
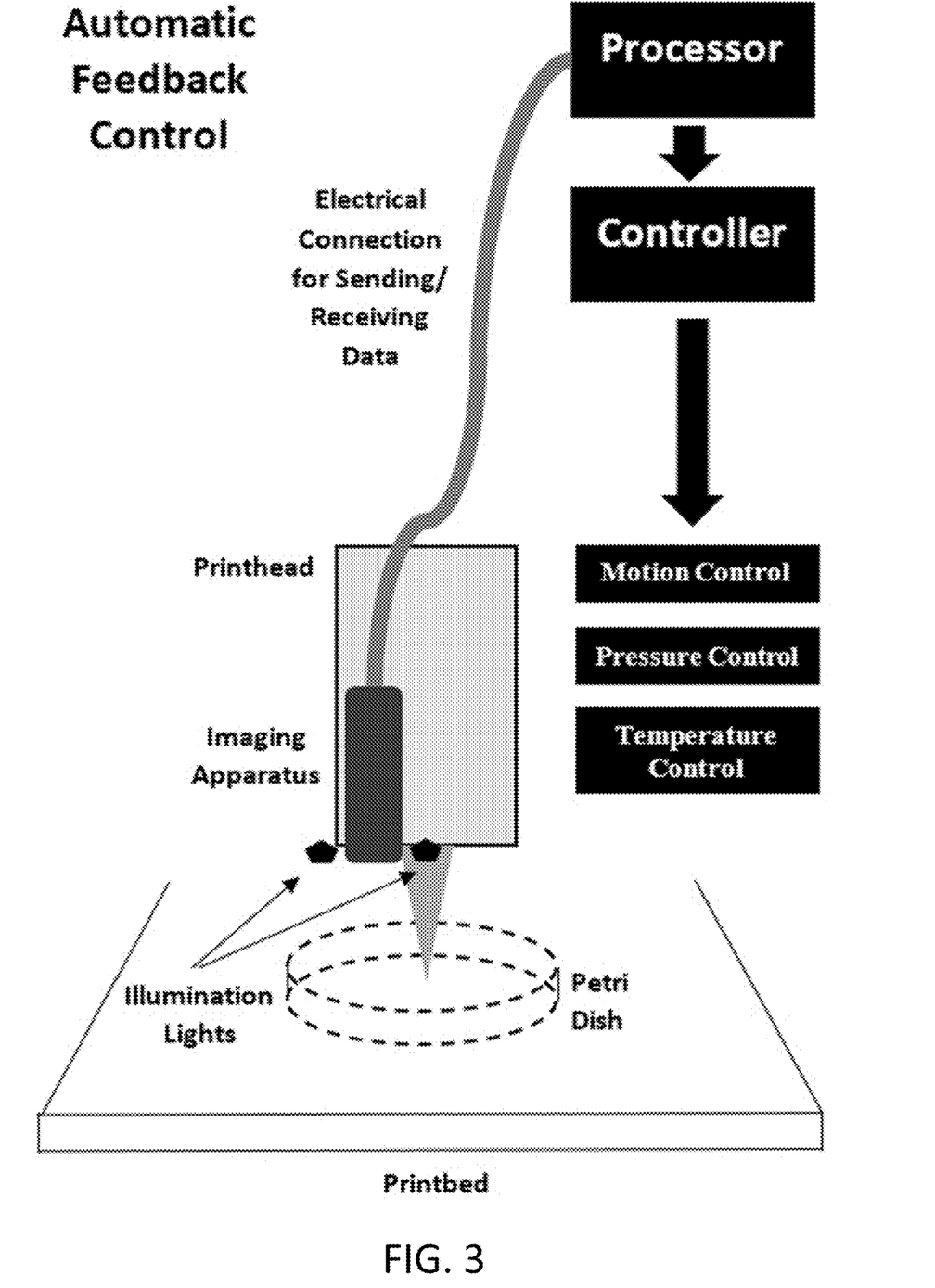
FIG. 3 is a schematic drawing of an automatic feedback control according to an embodiment.

According to embodiments, the optical imaging apparatus includes one or more cameras or video cameras attached to a printhead that is depositing the structure that is currently being imaged. In embodiments, the optical imaging apparatus can comprise multiple cameras or video cameras disposed on one or more printheads (which may or may not be the printhead(s) depositing material for the structure that is being imaged or analyzed). For example, the optical imaging apparatus can include at least two cameras offset to capture stereographic images. The camera, video camera, or multiple cameras or video cameras can be disposed on the same or different printheads or at another location within or in the proximity of the 3D printer or bioprinter. The imaging apparatus can comprise one or more illumination source and/or one or more illumination source can be included with the 3D printer or bioprinter to provide illumination for the imaging apparatus. As shown in FIG. 3, the illumination source(s), such as a light source, can be mounted on one or more printheads of the 3D printer or bioprinter in a manner to provide light for imaging placement of bioink on a print bed. In embodiments, the illumination source(s) can provide light having an illumination angle of up to 30 degrees, up to 45 degrees, up to 60 degrees, up to 90 degrees, up to 120 degrees, up to 180 degrees or more. In addition, the illumination sources can provide any single or combination of light colors and wavelengths for the illumination of the sample and/or bioink filaments. The illumination sources can be used to illuminate sample(s), microwell plate(s), 2D printed layer(s) and/or 3D printed structures.

According to embodiments, the optical imaging apparatus is able to capture images or videos before, during, and/or after printing, such as in real-time during the printing.

According to embodiments, the process or analysis algorithm receives and analyzes images or video captured from the imaging apparatus, which data and images can be captured and analyzed after printing all or some of the structure, such as in real-time. The analysis algorithm can utilize information from visual sensors to identify, isolate, and/or quantify the characteristics of the deposited structure before, during, or after some or all of the printing process. The process or analysis algorithm can also utilize information from visual sensors to identify, isolate, and/or quantify the characteristics of the deposited structure before, during, or after completion of one or more printed layer or each printed layer, such as in real-time.

According to embodiments, the learning algorithm facilitates machine learning so that the 3D printer or bioprinter can quantify, compare, and/or adjust the printing instructions based on the measured printed structure characteristics in real-time or before or after the completion of a printed layer or each printed layer. As a result, a better printed structure is generated by altering some, any and/or all of the printing parameters of the 3D printer or bioprinter in order to deposit ink, such as bioink, such as a filament or whole printed structure, that more closely resembles the structure defined by the user through the printing instructions.

In embodiments, the learning algorithm compares what is measured to what has previously been measured with other prints and adjusts the parameters respectively or makes recommendations on how to adjust the parameters. The learning algorithm can also be used to recommend new ink/bioink compositions based on some or all the data that has been collected (big data analysis). Additionally, the learning algorithm can also be used to determine the ideal printability parameters of a bioink with an unknown composition or a new composition that has yet to be tested.

According to embodiments, the learning algorithm can be a classification algorithm such as hierarchical clustering, k means clustering, linear discriminant analysis, logistic regression, support vector machines, k-nearest neighbor, recursive partitioning, decision trees, neural networks, Bayesian networks, and Hidden Markov models.

According to embodiments, the database integration permits the utilization of printability metrics from other users and/or the manufacturer. The printability metrics can be obtained from an external database and/or the manufacturer, from an incorporated barcode, or from an RFID chip within the packaging of the 3D printer or bioprinter or parts thereof, such as a barcode on a bioink cartridge.

According to embodiments, the 3D printer or bioprinter can be integrated with or incorporates clean chamber technology or a clean chamber housing which provides sterility during the printing process as described in International Patent Application Publication No. WO 2017/040675, US2010/0206224, 2017/0172765, 2015/0105891, 2009/003696, 2012/024675, RE43955, U.S. Pat. No. 7,894,921, WO2009/053100, U.S. Pat. Nos. 7,892,474, 8,394,313, 7,783,371, 7,636,610, 7,195,472, 7,052,263, 6,942,830, WO2008/055533, EP1732746, US2017/0225393, US2017/0100899, US2017/0080641, US2015/0246482, US2015/0102351, U.S. Pat. No. 9,073,261, each incorporated by reference herein in their entireties.

According to embodiments, the 3D printer or bioprinter can utilize a cellulose nanofibrillar dispersion as bioink as described in United States Patent Application Publication No. 20170368225, incorporated by reference herein in its entirety.

Figure 4:
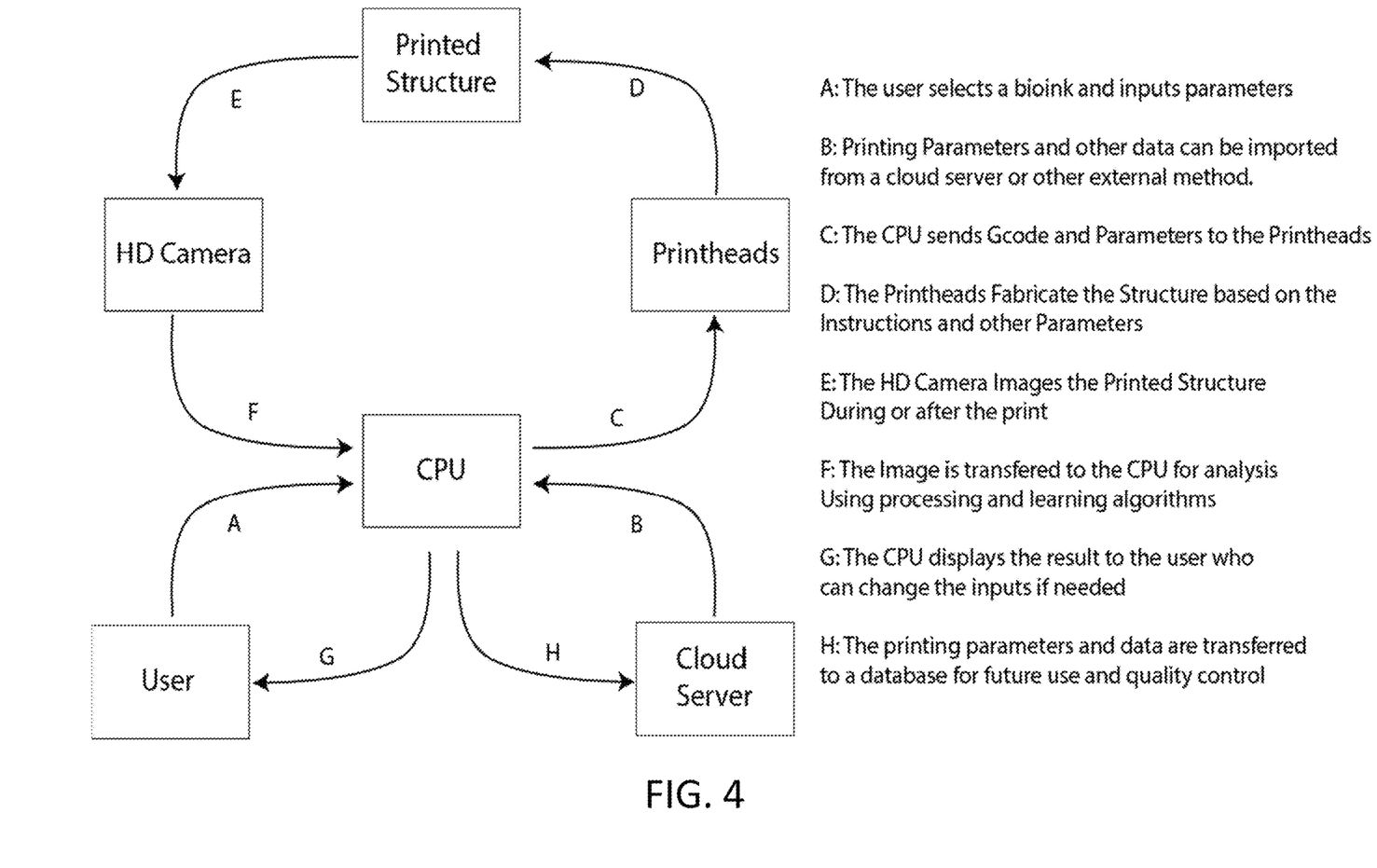
FIG. 4 is a flowchart of steps for an exemplary process according to an embodiment.
Figure 7:
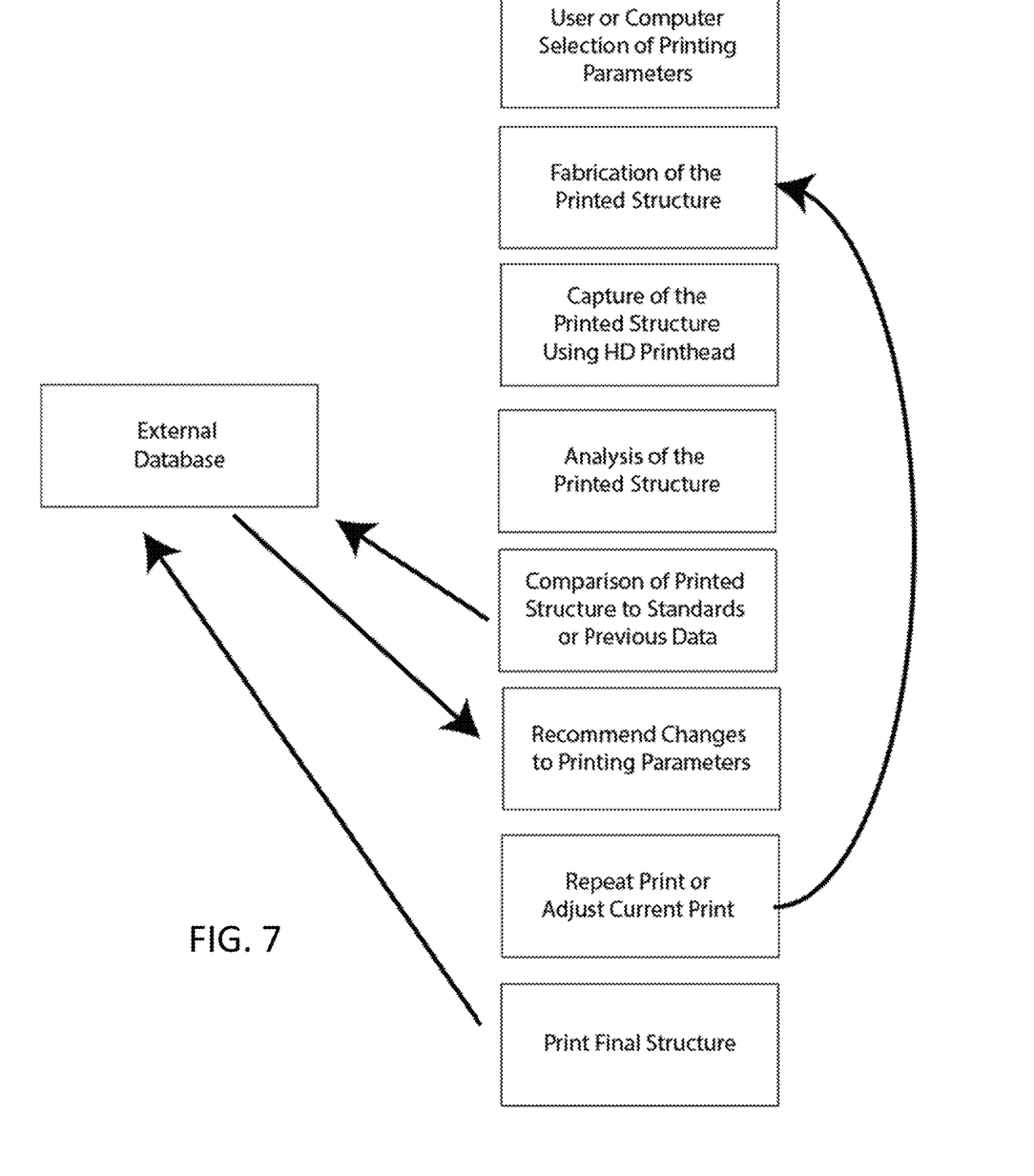
FIG. 7 is a flowchart of a printing process according to an embodiment.

Embodiments of the invention include methods of generating printing characteristics associated with various printing parameters for an ink or bioink. The flowcharts provided in FIGS. 4 and 7 provide examples of such methods. As shown in FIG. 4, the user selects an ink or bioink and inputs parameters associated with the ink or bioink into the printing program, such as printing pressure, extrusion rate, translation rate, layer height, printhead temperature, printbed temperature, and/or type of ink/bioink. Additionally or alternatively, printing parameters and other data can be imported from a cloud server or other external method. The central processing unit (CPU) sends Gcode and parameters to the printheads. The printheads fabricate a 3D structure from the ink or bioink according to the Gcode and/or other parameters if provided. The imaging apparatus images the printed structure during and/or after the print and the image(s) are transferred to the CPU for analysis, for example, using processing and learning algorithms. The CPU displays the results to the user and the inputs can be changed if desired. Subsequent prints can be performed and/or the printing parameters and/or printing data can be transferred to a database for future use and quality control. As shown in FIG. 7, the user and/or the computer selects printing parameters. The 3D structure is printed in accordance with instructions implementing the printing parameters. The structure is imaged using a camera, such as an HD camera. Analysis of the printed structure is performed to determine characteristics of the printed structure. The characteristics of the printed structure are compared with standards and/or previous data obtained through prior printing processes. The computer can recommend various changes to the printing parameters to obtain a printed structure that is closer in comparison with the standards and/or other previously obtained data. The printing process can then be repeated and/or the printing parameters changed based on the analysis and then the printing process can be repeated until a desirable final printed structure is obtained.

Another embodiment comprises a method for assessing printability of a bioink. The method can include any of the following steps:

(a) selecting one or more bioink, one or more printing parameters, and one or more printed structure characteristics;

(b) depositing the one or more bioink based on the selecting of the one or more bioink, the one or more printing parameters, and the one or more printed structure characteristics to create a first deposited structure;

(c) imaging the first deposited structure by one or more optical imaging apparatus to provide an optical image of the first deposited structure;

(d) analyzing the optical image by way of one or more algorithms;

(e) adjusting the printing parameters based on the analysis; and (f) depositing a second deposited structure based on the adjusting.

In assessing printability of bioinks, the 3D printer or bioprinter can compare the printed bioink to previously tested inks or bioinks and/or batch standards, and physically calibration targets that contain premade structures with 'ideal' diameters and shapes.

According to embodiments, one or more of the optical imaging, analysis, and/or adjustment of printing parameters and/or instructions can be repeated until a defined printed structure is achieved with satisfactory accuracy.

According to embodiments, the selection of bioink can be from preset bioink profiles that are loaded by a user or from an external database.

According to embodiments, the selection of printing parameters can be from a preset profile, loaded or adjusted by a user, or from an external database.

According to embodiments, the selection of the printed structure can be from a preset profile, loaded or adjusted by the user, or from an external database.

According to embodiments, the one or more algorithms can automatically modify and/or adjust the bioink profiles, printing parameters, and/or printed structure characteristics.

In embodiments, the algorithm(s) can compare the measured/imaged parameters to previously tested inks, the batch standards, and/or physical calibration targets that contain premade structures with 'ideal' diameters and shapes.

According to embodiments, adjustment of the printing instructions can include the positioning of the optical apparatus to permit imaging of the deposited structure.

According to embodiments, the analysis can be performed before, during, or after printing, such as in real-time, and the printing instructions are capable of being modified before, during, or after the print.

According to embodiments, the results of the analysis can be compiled in a database where such results are utilized to refine subsequent analysis.

Another embodiment provides a method for calibration of a bioink on a 3D printer or bioprinter. The method can include any of the following steps:
(a) providing a calibration target on a surface or fabricating a calibration target on a surface using a 3D printer or bioprinter;
(b) fabricating a bioink structure;
(c) imaging and preparing an image of the bioink structure and the calibration target;
(d) analyzing the image of the bioink structure and the calibration target by way of one or more algorithms; and
(e) adjusting one or more printing parameters based on the analyzing.

According to embodiments, the surface includes a print surface or a separate surface within the 3D printer or bioprinter or inserted into the 3D printer or bioprinter.

According to embodiments, the analyzing involves assessing one or more of filament thickness, uniformity, roughness, continuity, color, opacity, and/or geometry at intersections and/or other directional changes in comparison with the calibration target.

According to embodiments, the printing parameters are chosen from one or more of applied pressure, strain, force, or flow, printhead translation rate, bioink temperature, bioink composition, print surface temperature, layer height, infill pattern and density, nozzle diameter, nozzle shape, and/or nozzle material.

According to embodiments, the one or more calibration targets include patterned arrangements of droplets, filaments, geometric shapes, infill patterns, and/or multilayered structures.

According to embodiments, the one or more calibration targets are fabricated and customized based on input of a user or designation of integrated software and algorithms of the 3D printer or bioprinter.

According to embodiments, the separate surface includes one or more different materials including plastic, glass, hydrogel, or biomolecule coated surfaces to calibrate the one or more printing parameters on different surfaces.

According to embodiments, the one or more calibration targets are fabricated based on previous printability metrics and analysis performed and recommended by learning algorithms to more rapidly test a bioink.

For example, using a calibration target is a quick way to compare a filament or shape with an ideal filament or shape. In one iteration, the calibration target may have lines with diameters of 200 µm, 400 µm, 600 µm, 800 µm, etc. The user can quickly print a line, then compare the line to the targets. The comparison, for example, may involve comparing the printed bioink to the calibration target to determine if the bioink is printed with the same height and shape as the calibration target. This allows the user to quickly figure out how the material is printing initially so when the algorithm begins to optimize it knows what range of possible printing parameters to start at based on previous data. For example, if a user desires to print a line that is 450 µm in diameter, the objective is 500 µm. So the user knows that whatever parameters are desired to be tested should be between the parameters just used to achieve a 450 um diameter line and the parameters observed in the past to achieve a 600 µm line. The algorithm can be programmed to start homing down in that range.

According to embodiments, the fabrication of the bioink structure occurs adjacent to or in proximity of the one or more calibration targets for rapid analysis.

According to embodiments, one or more prefabricated calibration targets are provided to contain a range of filament diameters, heights, intersection angles along with geometric structures, and multilayered structures with various infill patterns and porosity.

According to embodiments, the one or more printing parameters are stored within the 3D printer or bioprinter and in a database on a per batch basis and are capable of serving as a quality control comparison point.

According to embodiments, the system can include a non-transitory computer storage media such as RAM which stores a set of computer-executable instructions (also referred to herein as computer-readable code, "code", or software) for instructing the processor(s) to carry out any of the algorithms and methods described in this disclosure. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include one or more sets of computer-executable instructions for providing an operating system as well as for implementing the algorithms and methods of the invention. The computer-executable instructions can be programmed in any suitable programming language, including JavaScript, C, C#, C++, Java, Python, Perl, Ruby, Swift, Visual Basic, and Objective C.

EXAMPLES

An example of a process algorithm may include the following steps. First a structure is deposited by a 3D printer system on a print surface. The parameters utilized to print the structure which may include applied pressure, strain, translation speed, nozzle shape, nozzle diameter, layer height, temperature of printhead and/or printbed can be recorded by the system. The structure is then imaged during or after the completion of the printing process. The image can be inputted into the process algorithm. The process algorithm filters out the background and isolates the region of interest. In this example, the region of interest may be a linear filament, but it can be any structure. After finding the region of interest, the application determines the boundaries of the filament or structure. The data on the location of these boundaries is extracted and then processed to quantify characteristics of the filament or structure such as diameter, uniformity, thickness, etc. This data is then presented to the user so the user can adjust the printing parameters based on the result and refine the printing process, if needed. Additionally, this data can be stored on the printer or uploaded to a database where it can refine other algorithms. See for example FIGS. 4 and 7.

Figure 6:
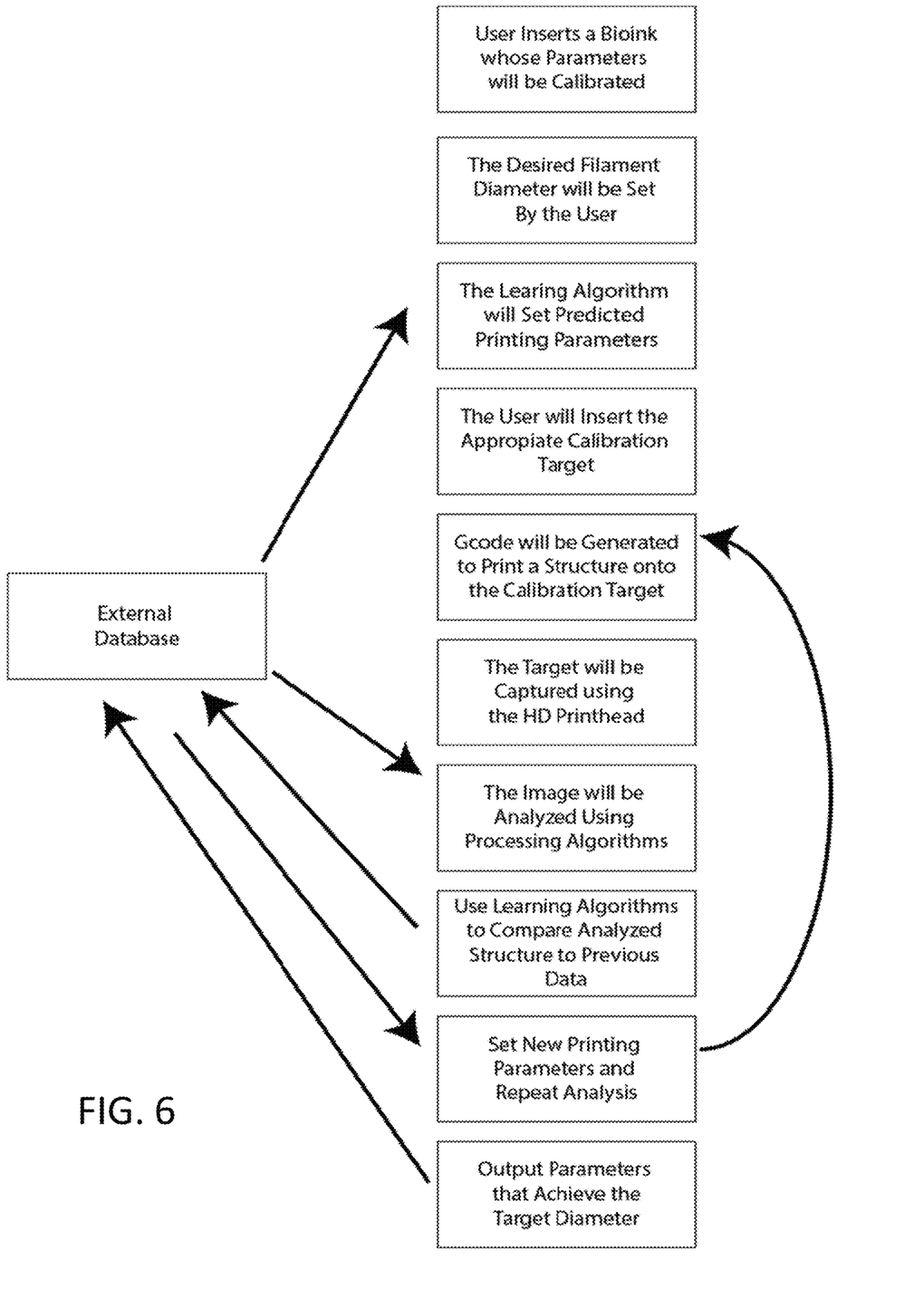
FIG. 6 is a flowchart of a method for ink/bioink calibration according to an embodiment.

An example of a learning algorithm may include the following steps. In this example, the learning algorithm is used to calibrate a bioink in real-time by comparing it to a standard and historical printing data. The user chooses the desired resulting structural characteristics. Based on previous data, the algorithm sets default printing parameters and then prints a structure. The algorithm then compares the characteristics of the resulting structure to the standard. The standard could be the theoretical ideal printing result or a calibration target that has a predefined structure that the print wants to achieve. Based on previous prints during this process, the current printing parameters, and/or the bioink composition, the algorithm predicts how the printing parameters should be adjusted to achieve the desired characteristics. This process can be repeated until the printing parameters that are recommended provide a structure within an acceptable error of the target. See, for example, FIG. 6, where a user inserts a bioink whose parameters will be calibrated, and the desired filament diameter is set by the user. The learning algorithm sets predicted printing parameters. The user inserts an appropriate calibration target and Gcode is generated to print a structure onto the calibration target. Then an image(s) of the printed structure is captured using a camera printhead and the image is analyzed using one or more process algorithm according to the invention. Additionally, one or more learning algorithms can be used to compare the analyzed structure to reference data, such as previous print data and/or stored data relating to other prints. New printing parameters can be set and associated Gcode provided for performing the printing using the new printing parameters. The printing and analysis steps can be repeated any number of times until the desired/target filament diameter is obtained. The printing parameters can be output to a database to be used later as a reference for parameters recommended and/or suggested for obtaining the desired/target filament diameter for that bioink.

Figure 5:
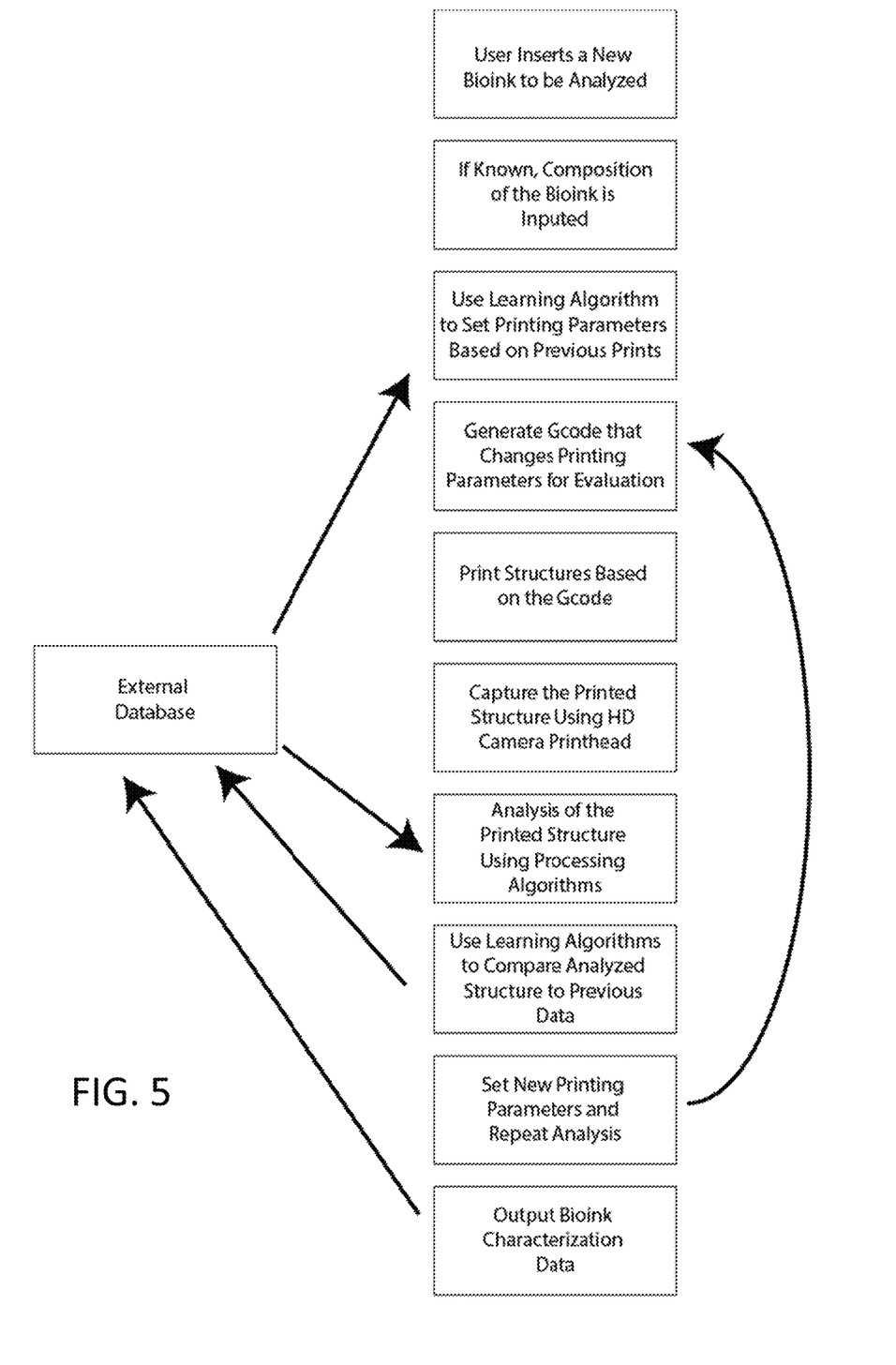
FIG. 5 is a flowchart of a method for ink/bioink characterization according to an embodiment.

Another example of a learning algorithm may include the following process. In this example, the learning algorithm is used to preset printing parameters based on the composition of the bioink that is provided by the user and/or other source. The user inputs data that relates to the composition of the bioink they want to print with, if known. The inputted data can include chemical base, concentration, composition, and/or type of material. The learning algorithm compares this bioink to previous bioink characteristics obtained, for example, from a reference source and/or previous prints and gives recommended printability data for the bioink. Gcode can be generated to change printing parameters for evaluation. The bioink calibration process can follow the steps in the above learning algorithm example to print a 3D structure, image the structure, analyze features of the structure, and compare the structure with other reference structures and/or previously printed structures. Alternatively, the algorithm can analyze one or more or all the printability data for one or more or all the bioinks as a whole and make recommendations for new bioinks or improvements in currently used bioinks regarding printability and composition. See, for example, FIG. 5.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Any of the methods disclosed herein can be used with any of the systems or devices disclosed herein or with any other systems or devices. Likewise, any of the disclosed systems or devices can be used with any of the methods disclosed herein or with any other methods. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A 3D bioprinter comprising:
(a) one or more printheads and one or more optical imaging apparatus disposed on one or more of the printheads in a manner such that the optical imaging apparatus is positioned to the side, above and/or below a nozzle and is capable of capturing images or video of bioink dispensed from the nozzle during printing;
(b) one or more control element;
(c) one or more processor and communication interface operably connecting and capable of communicating printability data from the one or more optical imaging apparatus to the one or more control element to control printing of a printed structure; and
(d) a non-transitory computer-readable storage media comprising:
(1) one or more process algorithms capable of quantifying printing characteristics chosen from one or more of shape, uniformity, thickness, size, and/or color of droplets or filaments of the bioink disposed from the nozzle from one or more images and/or video obtained with the optical imaging apparatus; and
(2) one or more learning algorithms capable of modifying and adjusting printing instructions and/or printing parameters based on one or more printability metrics to modify the printed structure in real time and before completion of the printing.

2. The 3D bioprinter of claim 1, wherein the one or more printability metrics are chosen from one or more of filament thickness, uniformity, roughness, continuity, color, opacity, and/or geometry at intersections and/or other directional changes.

3. The 3D bioprinter of claim 1, wherein the printing parameters are chosen from one or more of applied pressure, strain, force, or flow, printhead translation rate, bioink temperature, bioink composition, print surface temperature, layer height, infill pattern and density, nozzle diameter, nozzle shape, and/or nozzle material.

4. The 3D bioprinter of claim 1, wherein the one or more optical imaging apparatus is fixed or detachable.

5. The 3D bioprinter of claim 1, comprising one or more additional components chosen from motors, one or more print beds, one or more substrates for printing, one or more additional printed structures, one or more syringes, one or more platforms, one or more lasers, one or more operating controls, one or more power cables, and/or one or more USB cables.

6. The 3D bioprinter of claim 1, wherein the 3D bioprinter is in communication with or integrated with a database.

7. The 3D bioprinter of claim 1, wherein the 3D bioprinter is in communication with or integrated with a database for storing one or more printability analysis.

8. The 3D bioprinter of claim 1, wherein the 3D bioprinter is in communication with or integrated with a database for storing one or more printability analysis, which printability analysis is capable of being shared and compared across batches and users.

9. The 3D bioprinter of claim 1, wherein the one or more optical imaging apparatus comprises one or more infrared, near-infrared, visible, and/or UV sensors or cameras.

10. The 3D bioprinter of claim 1, wherein the printed structure is capable of serving as an optical or calibration target.

11. The 3D bioprinter of claim 1, wherein the printed structure is capable of serving as an optical or calibration target to allow rapid comparisons to known standard printable materials and internal controls.

12. The 3D bioprinter of claim 1, wherein the printed structure is capable of serving as an optical or calibration target and comprises one or more materials that are capable of being analyzed by software and thermal sensors or cameras including infrared-detecting sensors and/or cameras.

13. The 3D bioprinter of claim 1, wherein the printed structure which serves as an optical or calibration target comprises one or more of non-thermoresponsive filament, thermoresponsive filament, nozzle fidelic printable material, nozzle fidelic printable material chosen from thermoplastics or silicone, and/or materials that exhibit thermosensitivity.

14. The 3D bioprinter of claim 1, wherein the printing instructions comprise one or more of G-code files, STL files, text files, and/or manual inputs, wherein the manual inputs are capable of being provided by a user or generated through software.

15. The 3D bioprinter of claim 1, wherein the one or more optical imaging apparatus comprises one or more cameras and is disposed on one or more of the printheads that is an independent printhead not capable of depositing bioink.

16. The 3D bioprinter of claim 1, wherein the one or more optical imaging apparatus comprises one or more cameras and is disposed on one or more of the printheads that is capable of depositing material.

17. The 3D printer of bioprinter of claim 1, wherein the one or more optical imaging apparatus comprises at least two cameras disposed in a manner to capture one or more stereographic images.

18. The 3D bioprinter of claim 1, wherein the one or more optical imaging apparatus is capable of capturing images or videos in real-time during printing or post printing.

19. A 3D bioprinter comprising:
    (a) one or more printheads and one or more optical imaging apparatus disposed on one or more of the printheads in a manner such that the optical imaging apparatus is positioned to the side, above, and/or below a nozzle and is capable of capturing images or video of bioink dispensed from the nozzle during printing;
    (b) one or more control element;
    (c) one or more processor and communication interface operably connecting and capable of communicating printability data from the one or more optical imaging apparatus to the one or more control element to control printing of a printed structure; and
    (d) a non-transitory computer-readable storage media comprising:
        (1) one or more process algorithms capable of quantifying printing characteristics chosen from one or more of shape, uniformity, thickness, size, and/or color of droplets or filaments of the bioink disposed from the nozzle from one or more images and/or video obtained with the optical imaging apparatus; and
        (2) one or more learning algorithms capable of i) calibrating a bioink and ii) modifying and adjusting printing instructions and/or printing parameters based on one or more printability metrics to achieve a second printed structure.

20. The 3D bioprinter of claim 19, wherein the one or more learning algorithms capable of calibrating of the bioink are configured to compare imaging of the bioink against a calibration target.

21. The 3D bioprinter of claim 19, wherein one or more of the optical imaging apparatus, the one or more control element, the one or more process algorithms, and the one or more learning algorithms together are capable of calibrating the bioink by:
    (a) depositing the one or more bioink under both variable and constant printing parameters;
    (b) capturing an image of the deposited bioink;
    (c) evaluating the image; and
    (d) recommending one or more optimal printing parameter for the bioink.

22. The 3D bioprinter of claim 19, wherein the one or more learning algorithms are capable of recommending one or more optimal printing parameter for the bioink based on a captured image of deposited bioink.

* * * * *